United States Patent [19]
Kimura

[11] 3,770,356
[45] Nov. 6, 1973

[54] METHOD OF SPECTRA ANALYTICAL FILTER PAPER DUST SAMPLING

[75] Inventor: Kikuzi Kimura, Kanagawa, Japan

[73] Assignee: Shibata Kagaku Kikai Kogyo Kabushiki Kaisha, Tokyo, Japan

[22] Filed: June 30, 1972

[21] Appl. No.: 267,934

[30] Foreign Application Priority Data
July 23, 1971  Japan.............................. 46/54642

[52] U.S. Cl...................... 356/207, 356/38, 356/74
[51] Int. Cl. ......................................... G01n 21/12
[58] Field of Search.................... 356/207, 205, 173, 356/195, 38, 51, 74

[56] References Cited
UNITED STATES PATENTS
2,768,370  10/1956  Maninger.......................... 356/38 X
2,898,803  8/1959  Morrison ............................. 356/38

Primary Examiner—David Schonberg
Assistant Examiner—Paul K. Godwin
Attorney—James E. Armstrong et al.

[57] ABSTRACT

A method of spectra analytical filter paper dust sampling is provided whereby air-borne or natural, industrial dust, such as dust deposited in a room, soot emitted from plant chimneys, dust in emissions from automobiles, or dust originating from foundries, is captured on a sampling filter such as filter paper; the dust is exposed to an appropriate light of single short wave length; and by determining the optical density, the concentration of the air-borne dust can be determined using a prepared diagram showing the relationship between the air-borne dust and its optical density. Alternatively, each sample of air-borne dust collected on the sampling filter is exposed to a plurality of lights of different wave lengths; and then by finding the ratio of optical densities as measured by a pair of lights, the content of a specific component in the air-borne dust can be determined using a prepared diagram showing the relation between the content of the specific component in the air-borne dust and the ratio of optical densities.

9 Claims, 8 Drawing Figures

METHOD OF SPECTRA ANALYTICAL FILTER PAPER DUST SAMPLING

BACKGROUND OF THE INVENTION

In recent years air-borne dust is regarded as a public nuisance and is receiving increased attention.

Figure 7:
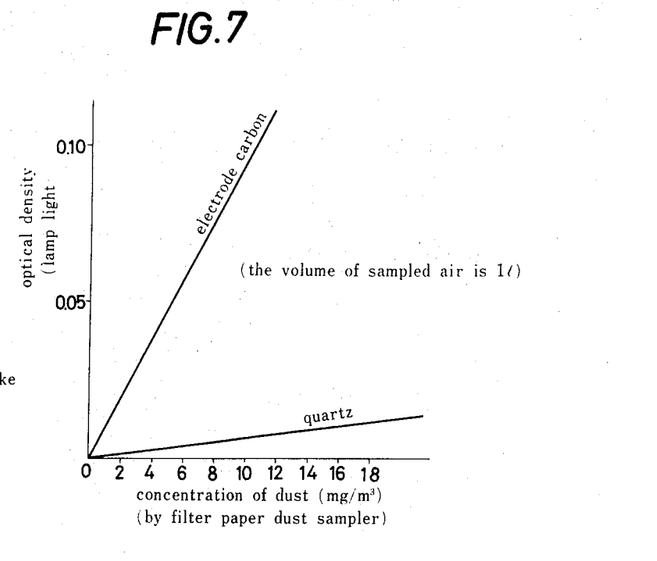
FIG. 7 is a graph illustrating the relation between concentration and optical density for electrode carbon and for quartz grains when the optical density has been measured under a lamp light with an air suction of 1 liter.

Also, in industry the incidence of various cases of poisoning or pneumoconiosis due to inhalation of dust emitted during production has long been noted. Methods for measuring this air-borne dust have been studied in the past and now a number of dust measuring techniques are available. In one of these techniques, the dust concentration is measured by capturing the dust on a sampling filter such as filter paper, exposing it to a light from a tungsten lamp (hereinafter to be referred to as lamp light) and estimating the dust concentration from a drop in the transmittance of the filter paper on which the dust has been collected, i.e., from the optical density of said filter paper. This method using such a lamp light, however, has the drawback that depending on the collar of dust to be measured, a great difference is liable to occur in the relation between the optical density and the dust concentration. For instance, take carbon and quartz, which make a striking contrast in color between them. In this case, the difference in the relation between optical density and dust concentration amounts to 15 times as illustrated in FIG. 7 and accordingly the reliability of the estimated dust concentration is extremely low.

To improve the reliability of the estimates in the measurement of dust concentration, for instance, various graphs indicating the relations between optical density and dust concentration have to be made available with different dusts and the dust concentration of a given site has to be estimated using an appropriate one of these graphs which applies to the specific dust to be measured.

This method may work when the type of dust at a site to be measured is known, but if the type is unknown or many types of dust are present in combination, it is impossible to select the appropriate graph. Even if the dust concentration has been found from the relation between air-borne dust and optical density, there is, as already mentioned, a great difference, depending on the color of dust, between optical density and dust concentration and the obtained estimate will inevitably be only approximate and unreliable. Besides, it would be a great bother to prepare an optical density vs. dust concentration diagram for each type of dust.

Moreover, the estimate of dust concentration from the optical density determined under the lamp light can be nothing but an approximation and cannot give the percentages of specific components blended in the air-borne dust.

Figure 8:
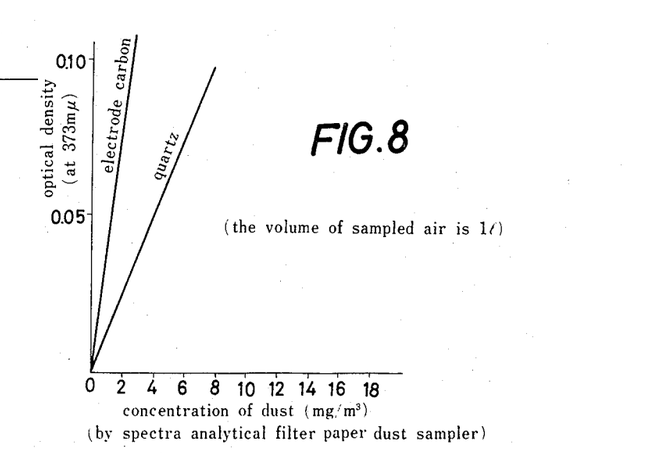
FIG. 8 is a graph illustrating the relation between concentration and optical density for electrode carbon and for quartz grains when the optical density has been measured under a light of wavelength 373m$\mu$ with an air suction of 1 liter.

The present invention has been accomplished after intensive studies to eliminate all of these drawbacks and troubles. According to the invented method of spectra analytical filter paper dust sampling, the concentration of air-borne dust can be simply determined with higher accuracy than any conventional method of this kind and the percentages of specific components in the air-borne dust can be swiftly and exactly measured. When an optical filter which can transmit only a near-ultraviolet ray, i.e., as from 360m$\mu$ to 390m$\mu$ of an appropriate single short wave length or similar ray is adopted together with a lamp light, as illustrated in FIG. 8 even the difference in the relation between optical density and dust concentration as, for instance, between carbon and quartz which are extremely contrasted in color can be reduced to a mere 4 times or so.

Thus without the need of preparing numerous graphs showing the relationship between optical density and dust concentration for countless types of dust to improve the reliability of the conventional method, a single graph prepared to show the relationship between optical density of air-borne dust and dust concentration as measured under a light of single short wave length will suffice for a highly accurate measurement of the concentration of air-borne dust in the atmosphere.

Moreover, the method of the invention can be used to readily determine the proportions of specific dust particles in the air-borne dust, such as the proportion of tobacco smoke in the air-borne dust of an office room; the proportion of soot in the smoke emitted from a plant chimney; the proportion of specific dust particle in the auto emission dust; or the proportion of metal particles in the air-borne dust of a foundry.

Namely, once, as described later, the relationship between the ratio of optical densities for two dusts under two lights of different wavelengths and the proportion of specific particles in the air-borne dust has been established in the form of a graph, the proportion of specific particles in the air-borne dust can be determined sumply from this graph by measuring the optical density of the air-borne dust under two lights of different wavelengths and finding the ratio of optical densities.

SUMMARY OF THE INVENTION

The first object of the present invention is to provide a more accurate, simpler and faster measurement of the optical density of air-borne dust than that of any conventional method, even when the air-borne dust contains particles of different colors, by merely finding the optical density of the air-borne dust to be measured under a near-ultraviolet ray of single short wavelength of, say, from 360m$\mu$ to 390m$\mu$ and using a prepared graph or the like which shows the relationship between dust concentration and optical density.

Another object of the present invention is to measure readily and swiftly the proportion of a specific type of particle in the air-borne dust, by simply finding the optical densities separately under a pair of lights with different wavelengths which are suitable for measuring the specific particles and then determining the ratio of these optical densities from a prepared graph or the like which shows the relationship between the proportion of the specific particle and the ratio of optical densities.

Still another object of the present invention is to provide a method for continuously measuring the concentration of air-borne dust and the proportion of a specific particle in the air-borne dust by using a sampling filter such as filter paper and successively charging a set of lights with different wavelengths, thereby accomplishing the first and second objects.

Still another object of the present invention is to provide as cheap an apparatus as possible for the measurement by combining a lamp light which gives a light of desired wavelength with an optical filter which transmits only the light of desired wavelength, thereby accomplishing the first and second objects.

According to the present invention, to accomplish these objects a specified amount of the air at the site to be measured is sucked through a sampling filter; the air-borne dust thus collected on the sampling filter is exposed to an appropriate light of single short wavelength of from 360m$\mu$ to 390m$\mu$ to find its optical density; and then the concentration of the air-borne dust is found from a prepared graph or the like which shows the relationship between dust concentration and optical density. Alternatively a similar sample of air-borne dust collected on the sampling filter is exposed to a plurality of lights with different wavelengths; the ratio of optical densities for one pair of lights among them is found; and then the proportion of a specific particle in the air-borne dust is estimated from a prepared graph or the like which shows the relation between the proportion of the specific particle and the ratio of optical densities.

BRIEF DESCRIPTION OF THE DRAWINGS

An embodiment of the present invention including the method and the apparatus for spectra analytical filter paper dust sampling will be clearly understood by reading the following detailed description with reference to the attached drawings.

Variations and modifications of the present invention in details are covered in the attached claims.

In the attached drawings.

DETAILED DESCRIPTION OF THE INVENTION

In the attached drawings, the same numerals are used to denote same items.

Figure 1:
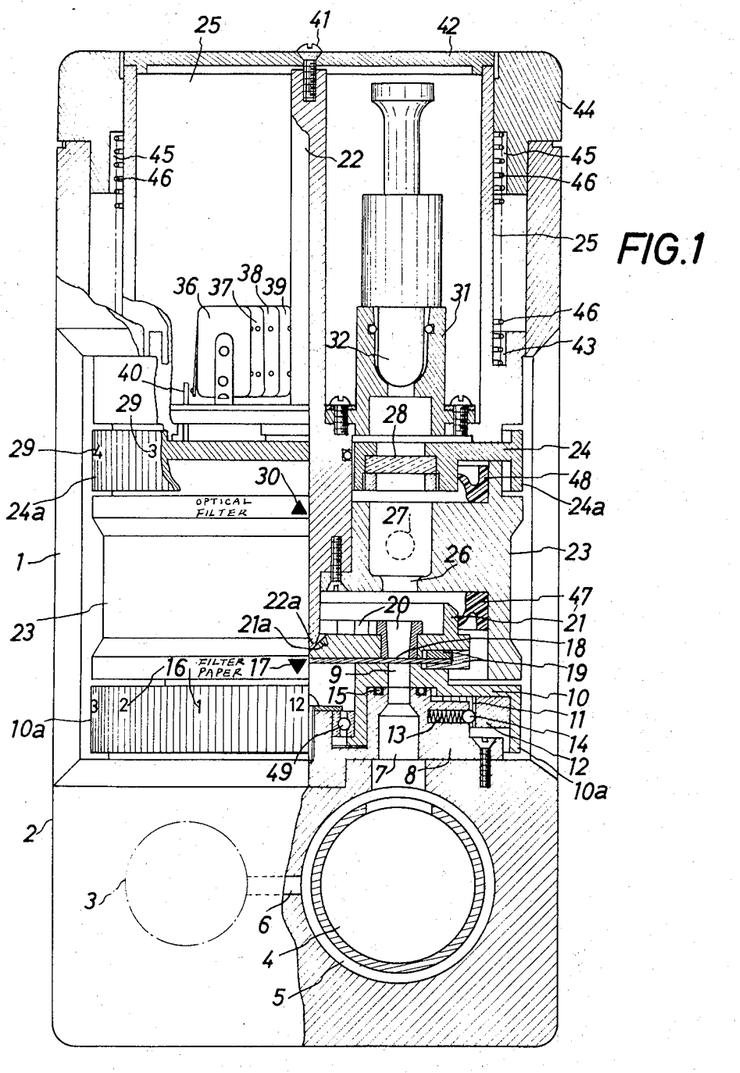
FIG. 1 is a partially sectional view of an embodiment illustrating the apparatus to be employed to carry out the method of the invention.
Figure 2:
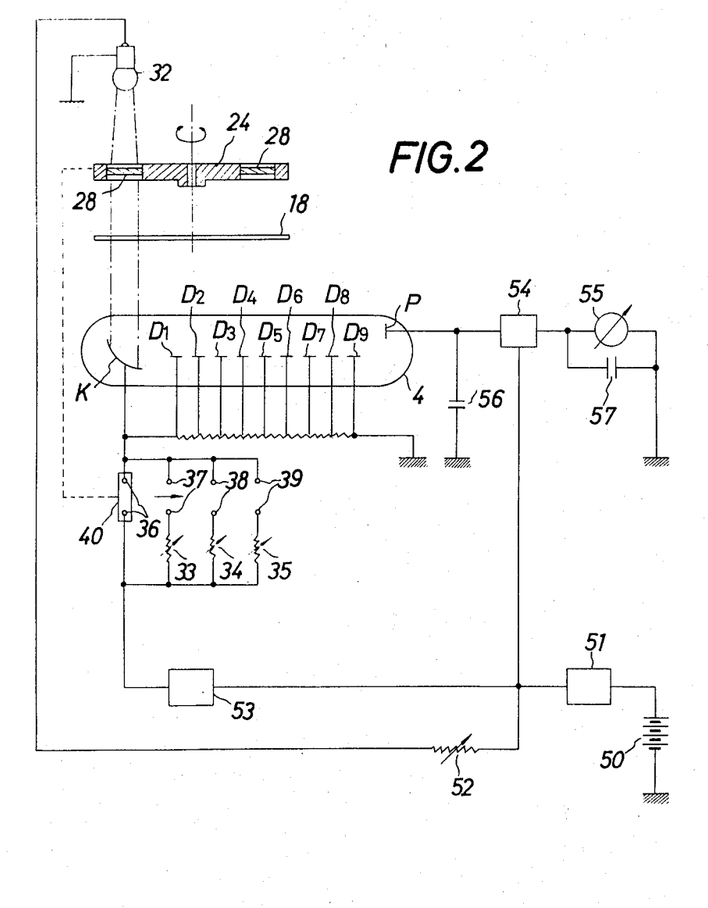
FIG. 2 is a block diagram showing the layout of this apparatus.

In FIGS. 1 and 2, the main assembly 2 equipped with an operation window 1 at the front comprises in its lower part a suction pump 3 which sucks only a specified amount of air. Suction pump 3 and a dark room 5, also provided in the lower part of the main assembly 2 and where a photo-multiplier 4 is housed, communicate with each other by means of an air hole 6.

Over the photo-multiplier 4 there is fixed a circular stand 8 bored with a light path 7 which serves also as the air hole. At a position opposite to said operation window 1 on the stand 8 is mounted a disk-shaped filter paper rotator 10 having a swing ring 10a whose periphery is perforated with 12 light paths 9 which serve also as air holes, said light paths 9 aligning with the above-mentioned light paths 7, in such manner that said rotator 10 may be rotated through the operation window 1. On the inside circumference of the swing ring 10a of said filter paper rotator 10 is integrally formed a filter paper-positioning ring 12 whose periphery is divided into 12 equal parts and provided with ball-engaging groves 11 so that said ring 12 may be locked at any of these parts; and against this ring is made to bear a ball 14 which is pressed by a spring 13 from the side of the stand 8.

On the upper edge of the light path 7 of the stand 8 is provided an O-ring which prevents the external air or light from invading the path 7 from between the filter paper rotator 10 and the stand 8. Sampling numbers 16, 1 – 12, are indicated at 12 positions on the periphery of the swing ring 10a where the filter paper rotator 10 is to be locked; and an index 17 to these numbers is provided on the lower cylinder 23 to be described later.

On the upper circumference of the filter paper rotator 10 is mounted a ring-shaped filter paper holder 19 detachably attached with a filter paper 18 large enough to block all the light paths 9. This filter paper holder 19 can freely pass through the operation window 1. Meanwhile on the top of the filter paper 8 is mounted a filter paper weight 21 with light paths 20 serving also as air holes provided at the positions corresponding to the light paths 9 of the filter paper rotator 10, so that both the light paths 9 and 20 may coincide.

The filter paper weight 21 has at its center a depression 21a of inverted cone shape; and this center is pressed against a pointed tip 22a at the bottom of the axial shaft 22 which is pushed down by the effect of a spring 46 to be described later and is free is rise and fall but unable to swing, so that when the filter paper rotator 10 is swung, the filter paper 18 attached by means of the filter paper rotator 10 and the filter paper holder 19 may be able to freely turn together with the filter paper weight 21.

To the axial shaft 22 is attached in the following order from bottom to top: the lower vertically movable cylinder 23 with H-section, the optical filter holder 24 and the upper vertically movable cylinder 25. The lower vertically movable cylinder 23 and the upper vertically movable cylinder 25 are fixed to the axial shaft 22, while the optical filter holder 24 is closely fitted between said cylinders 25 23 and can freely swing around the axial shaft 22.

The lower space in the lower cylinder 23 covers the filter paper holder 19 and the filter paper weight 21, while its topside ring-shaped circumference supports the optical filter holder 24. On the same axis as the light paths 7 9 20 respectively of the stand 8, the filter paper rotator 10 and the filter paper weight 21 are provided the light paths 26 which also serve as air holes; and on the side wall of this light path 26 is opened an air intake which does not permit invasion of light from outside.

On the outside of the optical filter holder 24 is integrally formed a swing ring 24a so that the optical filter holder 24 can be swung through the operation window 1. On the circumference which meets the light path 26 of the lower cylinder 23 are detachably provided at appropriate intervals four optical filters 28 which transmit only the lights of 373 mμ, 500 mμ, 600mμ and a desired wavelength. The optical filter numbers 29 indicating the positions of these optical filters 28 are displayed on the periphery of said swing ring 24a, while an index 30 to these numbers is provided on the outside of said lower cylinder 23.

Moreover, a tungsten lamp 32 connected through a bracket 31 to the power source is detachably attached to a site at the inside bottom of said upper cylinder 25 and just above the optical filter 28. At the optical filter 28 light from lamp 32 meets with the light paths 7, 9, 20, 26 passing through the stand 8, the filter paper rotator 10, the filter paper weight 21 and the lower cylinder 23, respectively. At the inside bottom on the opposite side are provided four microswitches 36, 37, 38, 39 for switching three variable resistors 33, 34, 35 to vary the multiplication factor of the photo-multiplier 4. These microswitches 36 to 39 are switched every time the optical filter 28 is switched by the switching piece 40 set on the optical filter holder 24.

At the top end of the axial shaft 22 is detachably screwed 41 a cap 42 covering the top of the upper cylinder 25. On the periphery of the upper cylinder 25 there is inserted a spring 46 between the spring groove 43 formed below and the spring groove 45 formed at the inside bottom of the upper cylinder guide tube 44 fixed to the top of the main assembly 2, said spring 46 constantly acting to press down the upper cylinder 25, the axial shaft 22, the optical filter holder 24, the lower cylinder 23 and the filter paper weight 21.

In FIG. 1 the items 47 48 are ring packings made of an elastic material like rubber which are fitted to the inside surface of said lower cylinder 23, said packing partially contacting in a ring fashion the outsides of the filter paper weight 21 and the optical filter holder 24 and thereby preventing external light or air from entering between the filter paper weight 21, the optical filter holder 24 and the upper cylinder 23. The item 49 is a ball bearing to help smooth rotation of the filter paper rotator 10.

The voltage stabilizer 51, connected to a battery 50 in FIG. 2, is connected through a variable resistor 52 to the lamp 32; connected through a high tension power circuit 53, variable resistance 33, 34, 35 and microswitches 36, 37, 38, 39 to the cathode K of the photo-multiplier 4; and connected through an amplifier 54 to the anode P of the photo-multiplier 4 and the optical density indicator 55.

The items D1 to D9 are the diodes in the photo-multiplier 4; and 56, 57 are capacitors.

The filter paper 18 is replaced as follows. The lower cylinder 23 is pulled down against the force of the spring 46. The filter paper holder 19 and the filter paper weight 21 are taken out through the observation window 1. The filter paper 18 held in the filter paper holder 19 is replaced. Thereafter, the filter paper holder 19 is put back in position; the lower cylinder is pushed up to assume the original position. The lower cylinder 23 is lowered under the action of the spring 46. The pointed tip 22a of the axial shaft 22 is fitted into the depression 21a of the filter paper weight 21. Thus the replacement of filter paper 18 is completed.

In returning the filter paper weight 21 and the filter paper holder 19 to the original position, the pins or the like which are provided in the filter paper weight 21 and the filter paper holder 19 are fitted into the locking groove provided in the filter paper rotator 10. Thus the filter paper weight 21 will be located in such a position that the light path 20 may at all times align with the other light paths 7, 9, 26.

Some examples of measuring the concentration of the air-borne dust and the proportion of a specific particle in the air-borne dust with use of the apparatus described referring to FIGS. 1 and 2 are as follows.

Example 1 — Measurement of the concentration of air-borne dust.

At first the swing ring 10a for the filter paper 18 in the apparatus as set as illustrated in FIGS. 1 and 2 is swung to set "1", i.e., the sampling number 16 to the index 17. Meanwhile, the swing ring 24a for the optical filter 28 is swung to set 1, i.e., the filter number 29 to the index 30 so that the optical filter 28 which transmits only the light of 373mμ wavelength can come in the light path running from the lamp 32 to the photo-multiplier 4.

Next the power supply is switched ON to light the lamp 32 and the variable resistor 52 is adjusted such that the optical density of the filter paper 18 corresponds to O on the optical density indicator 55.

Figure 3:
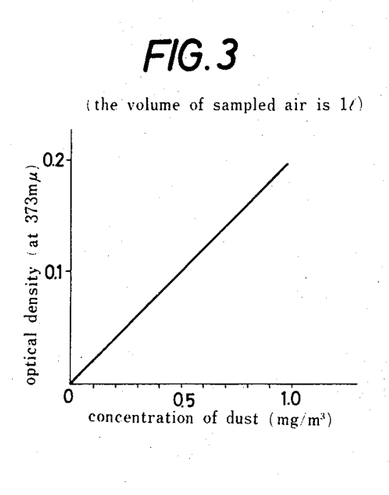
FIG. 3 is a graph showing the relation between the concentration and optical density of the air-borne dust when the optical density has been measured under a light of wavelength 373m$\mu$ and an air suction of 1 liter.

When this preparation has been finished, the suction pump 3 is switched ON to introduce the dust-laden air through the air intake 27. Thereupon the air flows through the light paths 26, 20, thereby depositing the air-borne dust on the filter paper 18; and only the air is exhausted outside by the suction pump 3 through the light paths 9, 7, through the gap between the photo-multiplier 4 and the dark room 5 and through the air hole 6. Reading on the optical density indicator 55 after this suction and exhaustion of air will give the optical density of the dust in 1 l of air. When this reading is compared with an experimentally prepared graph, as illustrated in FIG. 3, which shows the relation between the concentration and optical density of the air-borne dust, the concentration of the air-borne dust will be readily known.

When a measurement is to be made at a different site, the swing ring 10a for the filter paper 18 is turned to set 2, i.e., the sumpling number 16 to the index 17, thereby changing the filtering surface of the filter paper 18 and thereafter the same process and method as described above are repeated to measure the concentration of dust in 1m³ of the air at the changed site. Thus using the apparatus mentioned in this example, once the filter paper 18 has been set, the concentration of air-borne dust at 12 different sites can be measured by the same process and method with a mere change of the filtering surface of the filter paper 18 through a turning of the swing ring 10a.

Example 2 — Measurement of the proportion of tobacco smoke in the air-borne dust in a room.

By turning the swing ring 10a for filter paper 18 in the apparatus which has been set as shown in FIGS. 1 and 2, 1, i.e., the sampling number 16 is set to the index 17; and by turning the swing ring 24a for optical filter 28, 1, i.e., the optical filter number 29 is set to the index 30 so that the optical filter 28 which transmits only a light of 373mμ wavelength can come in the light path of the lamp 32. Next, the power supply is switched ON to ignite the lamp 32; and the variable resistor 52 is adjusted such that the optical density of the filter paper 18 correspond to 0 on the optical density indicator 55.

Then by turning the swing ring 24a for optical filter 28, 3, i.e., the optical filter number 29 is set to the index 30 so that the optical filter 28 which transmits only a light of 600mμ wavelength can come in the light path of the lamp 32.

In this turning operation a switching takes place at the same time from the microswitch 36 to the microswitch 38 by means of the switch changing piece 40. Then through adjustment of the variable resistor 34 the multiplication factor of the photo-multiplier 4 is so changed that the optical density of the filter paper 18 when the optical filter 28 which transmits only a light of 600mμ wavelength comes in the light path of the lamp 32 corresponds to 0 on the optical density indicator 55.

After the adjustment of the filter paper 18 when both the optical filters 28 come in the light path has been completed, first the swing ring 24a is turned to bring the optical filter 28 which transmits only a light of 373mμ into the light path of the lamp 32; then the suction pump 3 is switched ON to introduce an adequate volume of dust-laden air through the air intake 27 and thereby the reading on the optical density indicator 55 is taken. Next, after turning the swing ring 24a to bring the optical filter 28 which transmits only a light of 600mμ wavelength into the light path of the lamp 32, the reading on the optical density indicator is taken. Then the value of optical density obtained using the optical filter 28 which transmits only a light of 373mμ wavelength is divided by the value of optical density obtained using the optical filter 28 which transmits only a light of 600mμ wavelength.

When the result of this division is checked against a graph illustrated in FIG. 6 which has been prepared by the method to be described later, i.e., a graph expressing the relation between the ratio of optical densities as obtained using the two optical filters and the proportion of tobacco smoke in the air-borne dust, the proportion to tobacco smoke in the air-borne dust in the room to be measured can be known.

Suppose, for example, that the volume of air sucked by the suction pump 3 is one liter; the optical density obtained using an optical filter 28 which transmits only a light of 373mμ wavelength is 0.2, while the optical density obtained using an optical filter 28 which transmits only a light of 600mμ wavelength is 0.05. Then from FIG. 3 the concentration of the air-borne dust in this room is found to be 1mg/m³ and the proportion of tobacco smoke in the air-borne dust is found (by seeking 4, i.e., the result of diving 0.2 by 0.05 in FIG. 6) to be 60 percent, which means that the volume of tobacco smoke contained in the room air is 0.6mg/m³.

The reasons why the concentration of air-borne dust is measured using an optical filter 28 which transmits only a light of 373mμ and why the proportion of tobacco smoke in the air-borne dust is measured using optical filters 28 which transmit only lights of 373mμ and 600mμ respectively; and the method of preparing a graph illustrated in FIG. 6 will be described with reference to a specific example of making a measurement with use of more than three optical filters 28 which respectively transmit only lights of specific wavelengths. Moreover, the reason why it is necessary to change the optical filter 28 and the switches 36, 37, 38, 39 for changing the multiplication factor of the photo-multiplier 4 will be explained.

First the reason why an optical filter which transmits only a light of 373mμ wavelength is employed to measure the concentration of air-borne dust is as follows.

As stated under the Background of the Invention, when the lamp light is employed to measure the substances such as electrode carbon and quartz which are characterized by a marked contrast in the color, a great difference occurs, as illustrated in FIG. 7, in the relation between optical density and dust concentration and accordingly the measured value will lack in reliability. Thus, instead of using the lamp light alone an optical filter which transmits only a light of a certain single wavelength was coupled with the lamp light and tests were conducted using wavelengths ranging from short to long. As the result it has been discovered that when a light of shortwavelength, particularly from 360mμ to 390mμ, i.e., near-ultraviolet ray wavelength instead of one of long wavelength is employed for measurement, the difference in the relation between dust concentration and optical density, as illustrated in FIG. 8, is the least even between dust particles with a marked contrast in color and accordingly from 360mμ to 390mμ is judged to be the most favourable wavelength for assuring the lowest error in measurement.

Figure 4:
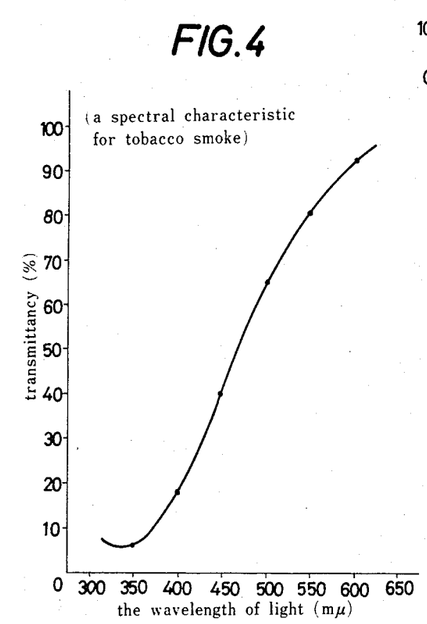
FIG. 4 is a graph illustrating the spectral characteristic of tabacco smoke.
Figure 5:
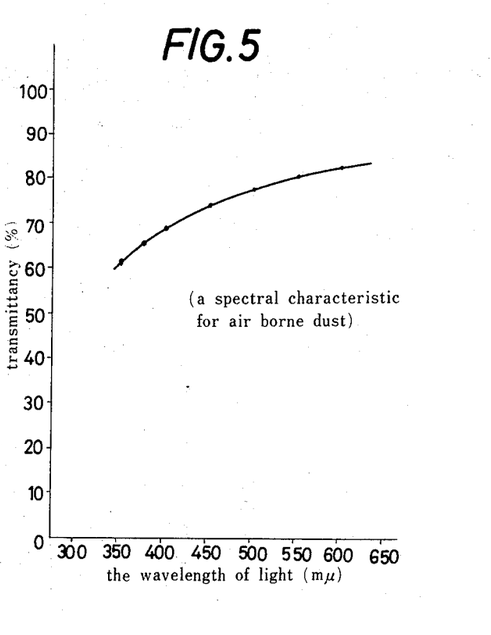
FIG. 5 is a graph illustrating the spectral characteristic of the air-borne dust.

Next, the reason why the optical filters which transmit respectively the lights of 373mμ and 600mμ only are employed for measuring the proportion of tobacco smoke in the air-borne dust is explained in FIGS. 4 and 5. Namely, in both the spectral characteristic of tobacco smoke and that of the air-borne dust the plots of measurements under lights of wavelengths ranging from 373mμ to 600mμ follow a nearly straight line rising toward the right.

Figure 6:
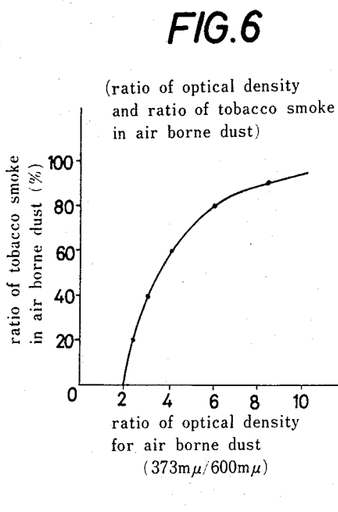
FIG. 6 is a graph illustrating the relation between the proportion of tobacco smoke in the air-borne dust and the ratio of the optical density measured under a light of wavelength 373m$\mu$ to the optical density measured under a light of wavelength 600m$\mu$.

Since there is a great difference between the transmittancy (which is indicative of optical density) as measureed under a light of 373mμ wavelength and that as measured under a light of 600mμ wavelength, in preparing the graph illustrated in FIG. 6 the ratio of optical densities can be obtained more easily with use of optical filters which transmit respectively 373mμ and 600mμ lights only; and in the determination of the concentration of the air-borne dust, as stated above, use of light of wavelengths ranging from 360mμ to 390mμ will be more favourable for measurement. Thus in determining the percentage and absolute volume of tobacco smoke in the air-borne dust it becomes necessary to employ an optical filter which transmits only a light of 373mμ for the purpose of getting the basic information, i.e., the concentration of air-borne dust.

To explain why in the graph expressing the light transmittancy the right rising portion is used, if the optical density obtained under a short wavelength light is divided by the optical density obtained under a long wavelength light, the result will be fractional and accordingly the prepared graph will be one with a fall in the right direction, which is inconvenient in reading the percentage value.

The graph illustrated in FIG. 6 is prepared as follows: putting:

percentage of tobacco smoke in the air-borne dust as $a$; percentage of other components in the air-borne dust as $b$; the result of dividing the optical density obtained when tobacco smoke is exposed to 373mμ light by the optical density obtained when it is exposed to 600mμ light (373mμ/600mμ) as A; the same value obtained of other components in the air-borne dust (373mμ/600mμ) as B; and the same value obtained of the air-borne dust which is a blend of tobacco smoke and other components (373mμ/600mμ) as $x$, the following general formulas will hold:

$$a+b=100$$

$$\frac{a+b}{\frac{a}{A}+\frac{b}{B}}=x$$

Now substituting the values of A and B calculated in advance from FIGS. 4 and 5, and an arbitrary value of $a$, say, 10, 20 or 30 into the above formulas, the value of $x$ is obtained. Then in the coordinates with the ratio of optical densities for air-borne dust (373mμ/600mμ) on the abscissa and the percentage of tobacco smoke in the air-borne dust on the ordinate, the values of $x$ are located and linked together to prepare a graph illustrated in FIG. 6. Once the graph of FIG. 6 has been made available, as already mentioned one can sample the dust-laden air which is a blend of tobacco smoke and other components and can readily know the percentage of tobacco smoke in the air-borne dust by locating the values of $x$ on the graph of FIG. 6.

A case of measuring the dust concentration with use of more than three optical filters 28 which respectively transmit only lights of different wavelengths is as follows.

As mentioned above, use of two optical filters meeting the spectral characteristic of a specific dust particle may suffice in measuring the percentage of a specific dust particle in the air-borne dust, if this particle is a substance like tobacco smoke which possesses a simple spectral characteristic. When, however, a dust in blue tone and a dust in purple tone are to be dealt with, the transmittancy under 373mμ light and the transmittancy under 600mμ light may be approximately similar, but under 500mμ the relation is quite opposite, that is, the transmittancy of dust in blue tone is higher under 500mμ light than under 373mμ or 600mμ light, while the trend is reversed with dust in purple tone. Thus the spectral characteristic of dust in blue tone gives a near-W shape of graph, whereas that of dust in purple tone gives a near-M shape of graph. Therefore when it is to be determined how much of such dusts in different tones are contained in the air-borne dust, it would be necessary to employ three optical filters which respectively transmit lights of 373mμ, 500mμ and 600mμ wavelengths. For this reason, the graph, as illustrated in FIG. 6, expressing the percentage of a specific component in the air-borne dust should be prepared on the basis of the right rising portion of the spectral characteristic curve for the specific component, i.e., in the case of blue dust, the curved portion obtained under a light of wavelength from 373mμ to 500mμ, and in the case of purple dust, the curved portion obtained under a light of wavelength from 500mμ to 600mμ; and the corresponding portion of the air-borne dust. When only the optical densities obtained under lights of 373mμ and 600mμ wavelengths are employed, it would be impossible to distinguish between two different systems of dust which are blended together. Thus a graph for two different systems of dust has to be prepared in advance.

Therefore even in practical measurements, optical filters which respectively transmit 373mμ and 500mμ lights would be needed to determine how much of blue dust is contained in the air-borne dust and optical filters which respectively transmit 500mμ and 600mμ lights would be to determine how much of purple dust is contained in the air-borne dust. Thus, for measurement of blue dust content and purple dust content in the air-borne dust, three optical filters which respectively transmit only lights of 373mμ, 500mμ and 600mμ wavelengths would be required.

When one and the same apparatus is to be employed for measurement of the concentration of air-borne dust in a room air and the percentage of tobacco smoke in this dust and subsequently for measurement of the concentration of air-borne dust in the air of a foundry and the percentage of metallic powder therein, naturally it would be necessary to have as many optical filters as required for the spectral characteristic of tobacco smoke and for that of metallic powder; and then the site of measurement is charged and the percentages of different components in the air-borne dust are measured there, of course the number of optical filters necessitated would depend on the spectral characteristics of these components.

Next the reason why the change of microswitches 36 to 39 is interlocked with the change of optical filters 28 is to be explained.

Before measuring the optical density of dust collected on the filter paper 18, the optical density of the filter paper has to be set at 0. If in this case there is only a device for adjusting the light intensity of the lamp by a variable resistor 52, in the presence of a plurality of optical filters 28 it becomes necessary to keep records of zero adjustment of filter paper under use of the first optical filter and zero adjustments of filter paper under use of the second and succeeding optical filters by each time measuring them by the variable resistor 52 and, every time the optical filter is changed, to make the corresponding zero adjustment of the variable resistor 52, which would be very troublesome in operation.

According to the present invention, as for the first optical filter zero adjustment of filter paper is finished by adjusting the light intensity of lamp by the variable resistor 52; and as for the second and succeeding optical filters, every time the optical filter is changed, the variable resistors 33 to 35 which can independently change the multiplication factor of the photo-multiplier 4, as shown in FIG. 2, are used to make pre-measurement zero adjustment of filter paper 18, thereby facilitating the pre-measurement operation.

As described alone in detail, the conventional method of measuring the dust concentration with use of the filter paper is not only incapable of giving any reliable value of even the concentration of air-borne dust, but also it is fatally inperfect in that it cannot measure the proportions of specific components in the air-borne dust; and in many other respects.

According to the invented method of spectra analytical filter paper dust sampling all these imperfections can be liquidated. Namely, according to the present invention, it is possible to determine the concentration of air-borne dust from a prepared graph or the like by collecting the air-borne dust on a sampling filter like the filter paper and exposing it to a light of appropriate single wavelength ranging from 360mμ to 390mμ to find its optical density, or to determine the concentration of a specific component in the air-borne dust from a prepared graph or the like by submitting a sample of air-borne dust collected on the sampling filter to a plurality of lights with different wavelengths to find the ratio of two optical densities.

Thus when the invented apparatus is employed in the measurement of the optical density of the air-borne dust, it is possible, whatever may be the site of measurement or the kind of air-borne dust and whatever may be the color contrast between specific components blended in the air-borne dust, not only to measure the concentration of air-borne dust with high reliability, using a sample graph of optical density vs. concentration of air-borne dust, but also to measure even the percentage and concentration of a specific component in the air-borne dust from the relevant graph by merely measuring the optical densities of the air-borne dust using optical filters of more than two different wavelengths and finding the ratio of these optical densities.

Also the adoption of the apparatus described in examples of execution according to the present invention will assure great convenience in operation, because even in the presence of plurality of optical filters zero adjustment has only to be made of the filter paper for each optical filter and thereafter no zero adjustment of the optical density of filter paper needs to be made very time the optical filter is changed in mid-measurement.

Further, when the dust sampler and the optical density measuring device are integrated as a unit, both dust sampling and optical density measurement of dust can be performed simultaneously and even the measurement of the concentration of air-borne dust and the percentage of a specific component therein can be swiftly done at the site of measurement.

Moreover, by merely changing the filtering surface of the filter paper the concentration of air-borne dust and the percentage of a specific component therein can be made in succession at several different sites, thereby saving much time and labour.

As understood from the above descriptions, the method of spectra analytical filter paper dust sampling is found to possess many industrial advantages over the conventional method and apparatus of this kind.

What is claimed is:

1. Method of spectra analytical filter paper dust sampling, which comprise the steps of measuring the optical density of the air-borne dust collected on a sampling filter through exposure to an appropriate light of near-ultraviolet as from 360m$\mu$ to 390m$\mu$ single wavelength and determining the concentration of the air-borne dust from the optical density thus obtained.

2. Method of spectra analytical filter paper dust sampling, which comprises the steps of measuring the optical density of the air-borne dust collected on a sampling filter under a pair of lights from among a plurality of lights with different wavelengths and finding the percentage of a specific component in the air-borne dust from the ratio of optical densities thus obtained.

3. Method of spectra analytical filter paper dust sampling according to claim 1, wherein a plurality of different dusts are sampled on the sampling filter by changing the filtering surface of the sampling filter relative to the dust sampling hole.

4. Method of spectra analytical filter paper dust sampling according to claim 1, wherein an experimentally prepared graph which expresses the relationship between optical density and concentration of air-borne dust is utilized for finding the concentration of air-borne dust from the optical density of the dust.

5. Method of spectra analytical filter paper dust sampling according to claim 2, wherein an experimentally prepared graph which expresses the relationship between the ratio of optical densities for the air-borne dust and the percentage of a specific component in the air-borne dust is employed for finding the percentage of a specific component in the air-borne dust from the ratio of optical densities as measured separately under a pair of optical filters from among a number of optical filters.

6. Method of spectra analytical filter paper dust sampling according to claim 1, wherein an optical filter which transmits only a light of the desired wavelength is employed as method for obtaining light of near-ultraviolet as from 360m$\mu$ to 390m$\mu$ appropriate single short wavelength and a tungsten lamp is used as the light source for the filter.

7. Method of spectra analytical filter paper dust sampling according to claim 2, where a plurality of optical filters which transmit only the lights of the desired wavelengths is employed as means for giving lights of different wavelengths; and a tungsten lamp is employed as the light source.

8. Method of spectra analytical filter paper dust sampling according to claim 1, wherein the light intensity of lamp is controlled for zero adjustment of the optical density of the sampling filter.

9. Method of spectra analytical filter paper dust sampling according to claim 7, wherein in the zero adjustment of the optical density of sampling filter using a plurality of lights with different wavelengths, the light intensity of light source is controlled for a light of one wavelength; and the amplification factor of an amplifier is controlled individually for the other lights of different wavelength.

* * * * *